Figure 1:
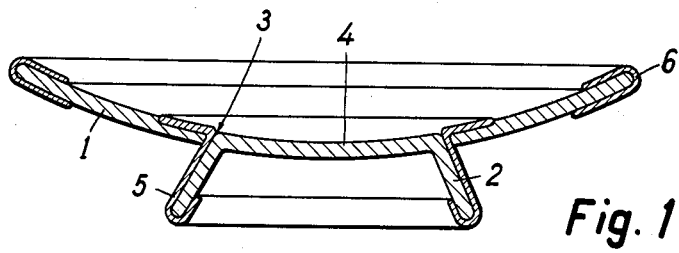

Feb. 19, 1963    J. LEWERTH    3,078,005
DOUBLE BOWL, SUITABLE AS A LID FOR KITCHEN
UTENSILS OR A SERVING BOWL
Filed March 23, 1960

Inventor:
JOSEF LEWERTH
by Mestern & Kollin
ATTORNEYS 3,078,005
DOUBLE BOWL, SUITABLE AS A LID FOR KITCHEN UTENSILS OR A SERVING BOWL
Josef Lewerth, Seligenstadt, Hesse, Germany, assignor to Firma Mitteldeutsche Emaillierwerke M. Fratscher & Co., Seligenstadt, Hesse, Germany
Filed Mar. 23, 1960, Ser. No. 17,065
Claims priority, application Germany Mar. 28, 1959
3 Claims. (Cl. 220—20)

It is known to shape lids for cooking utensils in such a way that they can be used according to desire as serving plates, i.e. as plates for kitchen utensils proper, or as recipients for food. In a known construction of this kind, the handle of the lid is provided with a bearing surface or with supporting points in a horizontal plane on which the lid can be safely placed in an inverted position. In other constructions two or more handles are provided which are arranged close to the periphery of the lid, and which serve as feet for the inverted placing of the lid. In another arrangement, a detachable handle is provided and the lid is flattened at its concave side in such a way that, upon the removal of the handle, the lid can be safely put on a surface.

The invention relates to a lid for kitchen utensils which can also be used as a serving plate. According to the invention it is basically a double bowl which is formed of two bowls, the bottoms of which abut one another and which are thus connected together. Double bowls of this kind, which are, however, not used as lids for kitchen utensils, are known per se. They were manufactured up to now by welding or riveting together the single bowls, with their bottoms of which placed next to each other; the disadvantage resulting from this way of production resides in the fact that small gaps exist between the bottom surfaces which are put face to face and in which dirt accumulates and can only be cleaned with difficulty, or even not at all.

The invention consists in the fact that one of the single bowls, which forms the lid for utensils or the double-bowl, is put into a recess of the bottom of the other bowl, and both bowls are attached to one another by means of a surrounding metal jacket which is flanged, on the one hand, around the edge of one bowl and, on the other hand, around the edge of the bottom recess of the other bowl.

A bowl constructed according to the present invention has the advantage of eliminating the small gap between the two bowls; thus no dirt can accumulate within the contact area of the two bowls, and there is no difficulty in cleaning the bowl in this particular area. The connection of the bowls by means of a metal jacket according to the invention has, furthermore, the advantage that artistic effects can be attained in a simple way. Both bowls can for example be provided with an enamel finish, possibly of different colors, while the metal jacket, connecting the two bowls, may consist of silver- or gold-colored metal. There can, for example, be ornamental recesses on the jacket so that the colored enamel finish becomes visible according to the said ornamental recesses. The jacket can, however, be differently decorated, as for instance with an imprinted or baked-on pattern.

The double bowl may consist of two equally large bowls. Preferably, however, a double bowl is used where in the bottom central aperture of a concave shell of larger diameter a concave shell of smaller diameter is fixed, the latter serving as a foot for the double bowl or—in case the bowl is destined as a lid for kitchen utensils—as a lid-handle.

Figure 2:
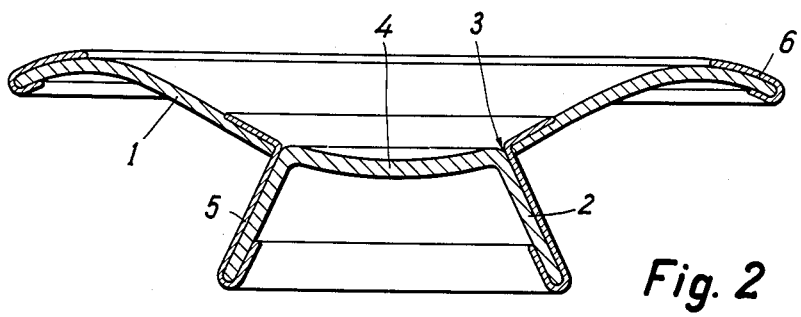
Figure 3:
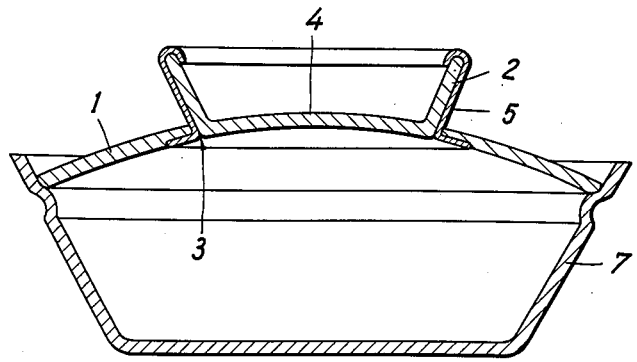

The invention is to be elucidated further with reference to the drawing in which: FIGS. 1 and 2 show, in section, two embodiments of the invention; FIG. 3 shows a section through a kitchen utensil with a modified double bowl according to the invention, similar to that of FIG. 1, which serves as a lid .

The double bowl illustrated in the drawing consists of a bowl 1 of larger diameter and of a bowl 2 with a smaller diameter. According to the invention, the bowl with the smaller diameter is placed in a bottom recess 3 of the larger bowl and connected to it by means of a metal jacket which is flanged on the one hand around the edge of the inserted bowl so as positively to engage the latter, and on the other hand around the edge of the bottom recess 3 of the other bowl. The bottom 4 of the smaller bowl is curved towards the interior in accordance with the curvature of the larger bowl, so that its curvature corresponding to that of the larger bowl. It goes without saying that the bottom 4 can be flat or can even be curved in the opposite direction.

The jacket can, according to its application or intended artistic effect, consist of any metal; it can further be perforated, embossed or shaped in any other manner.

Advantageously, the edge of the larger bowl 1 is provided with a metal ring 6, fixed by flanging, rolling or the like, which serves at the same time for protection and as an ornament.

FIGURE 3 shows the use of a double bowl according to the invention as a lid for a kitchen utensil 7. In this use the small bowl 2 serves as a lid handle as well as a base upon which the lid reposes in its inverted position (FIG. 1). As an example, FIG. 2 shows a double bowl with a depending edge which serves exclusively as a serving plate.

According to the invention, the hitherto employed welding and riveting of the two bowls, which had been necessary for their connection, and the disadvantages resulting from this method of connection are now eliminated. Both bowls are separately manufactured, enameled and connected thereafter by means of the jacket 5 by flanging the jacket edge. Such a connection is simply in its execution and results in a neat and pleasing form.

I claim:
1. A serving lid for a vessel, comprising a concave first shell member provided with a central aperture, a second shell member having outwardly flaring walls opening opposite that of said first member, said second member having a bottom wall portion receivable with peripheral clearance within said aperture, and connecting means completely filling said clearance while securing said second member to said first member.

2. A serving lid for a vessel, comprising a concave first shell member provided with a central aperture, a second shell member having outwardly flaring walls opening opposite that of said first member, said second member having a bottom wall portion receivable with peripheral clearance within said aperture, thereby forming the floor of said first member, and a lateral wall portion diverging outwardly from said aperture, and connecting means completely filling said clearance and engaging said lateral wall portion, thereby urging said second member into said aperture and securing it to said first member.

3. A serving lid for a vessel, comprising a concave first shell member provided with a central aperture; a second shell member having outwardly flaring walls opening opposite that of said first member, said second member having a bottom wall portion receivable with clearance within said aperture, thereby forming the floor of said first member, and a lateral wall portion extending from said aperture; and connecting means completely filling said clearance and positively engaging said first member at said aperture and said lateral wall portion while securing said second member to said first member.

References Cited in the file of this patent

UNITED STATES PATENTS

| | | |
|---|---|---|
| 797,314 | Owens | Aug. 15, 1905 |
| 2,523,526 | Sciurba | Sept. 26, 1950 |

FOREIGN PATENTS

| | | |
|---|---|---|
| 242,877 | Great Britain | Nov. 19, 1925 |
| 852,894 | German | Oct. 20, 1952 |